Patented Apr. 4, 1950

2,502,451

UNITED STATES PATENT OFFICE 2,502,451

AMINO-ALKYL ESTERS OF DIPHENYLAMINE 2-MONOCARBOXYLIC ACIDS

Alan August Goldberg and Harold Silas Turner, Bradford-on-Avon, England, assignors to Ward, Blenkinsop & Company Limited, Liverpool, England, a British company No Drawing. Application May 10, 1946, Serial No. 668,772. In Great Britain May 7, 1945

Section 1, Public Law 690, August 8, 1946
Patent expires May 7, 1965

9 Claims. (Cl. 260—472)

This invention relates to the production of amino-alkyl esters of diphenylamine 2-monocarboxylic acids and of salts thereof.

The present invention provides amino-alkyl esters of diphenylamine monocarboxylic acids of the general formula

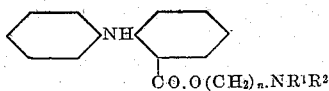

in which $R^1$ and $R^2$ are alkyl groups and $n$ is an integer not greater than six.

The invention also consists in a process for the production of an aminoalkyl ester of a diphenylamine 2-monocarboxylic acid of the aforesaid general formula which comprises the steps of mixing an esterifiable functional derivative of the diphenylamine 2-monocarboxylic acid with an amino alcohol of the general formula

in which $R^1$, $R^2$ and $n$ are as above defined, reacting the mixture to form the ester of said substance and recovering said ester from the reaction mixture.

According to a feature of the invention the free amino ester may be converted into a water-soluble salt thereof such as a hydrohalide or the acetate, lactate, methane sulphonate or isethionate.

The diphenylamine 2-monocarboxylic acids which form a starting material for the process of the present invention are generally obtained by the interaction of a halogenobenzoic acid with aniline or a homologue thereof, generally in the presence of copper powder and/or an acid acceptor. Either the aniline or the 2-halogenobenzoic acid or both may contain one or more substituents such as halogens, acylated amino, disubstituted amino (for example, dimethylamino and methyl-phenylamino), nitro, hydroxy, alkoxy (for example, methoxy and ethoxy), aryloxy substituted alkyl, aryl and substituted aryl. The diphenylamine 2-monocarboxylic acid used as starting material may also be made by the condensation of an aminobenzoic acid or a substituted aminobenzoic acid with a halogen benzene or substituted halogeno benzene.

The diphenylamine 2-monocarboxylic acid used may, for example, be N-phenylanthranilic acid or a substituted N-phenylanthranilic acid such as 2'-, 3'- and 4'- chlorodiphenylamine-2-carboxylic acids, 2'.4'-dichlorodiphenylamine-2-carboxylic-acid, 5-chloro-4'-methoxy-diphenylamine-2-carboxylic acid, 5-chloro-4'-methoxy-2'-nitro diphenylamine-2-carboxylic acid, 4'-chloro-2'.6' - dinitrodiphenylamine-2-carboxylic acid, 4'-bromo-diphenylamine-2-carboxylic acid, 2'-hydroxy-diphenylamine - 2 - carboxylic acid, 2'- and 3'-methoxy-diphenylamine-2-carboxylic acids, 2'-, 3'- and 4'-nitro diphenylamine-2-carboxylic acids, 4-chloro - 2'.6' - dinitro diphenylamine-2-carboxylic acid, 2'.4'.6'- trinitro diphenylamine - 2 - carboxylic acid, 4'-dimethylamino-5-chloro - diphenylamine - 2 - carboxylic acid, 2'-, 3'- and 4'-methyldiphenylamine-2-carboxylic acids, 4'-phenyldiphenylamine - 2 - carboxylic acid, 4'-phenylamino diphenylamine-2-carboxylic acid and 4' phenoxy-diphenylamine-2-carboxylic acid.

There may also be used any of the homonuclear or heteronuclear polyhalogeno diphenylamine 2-monocarboxylic acids obtained by the condensation of a polyhalogeno benzoic acid with a mono or polyhalogenated aniline such as 2':4':4:6 - tetrachlorodiphenylamine - 2 - carboxylic acid or 4':3:5-trichlorodiphenylamine-2-carboxylic acid.

The N-disubstituted amino alcohols employed in accordance with the process of the invention are preferably but not necessarily straight chain amino alcohols i. e. of the formula

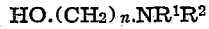

and which preferably contain a small number of carbon atoms such as N-disubstituted ethanolamines, N-disubstituted propanolamines, N-disubstituted butanolamines and N-disubstituted hexanolamines. Examples of such alkanolamines are dimethylamino-ethanol, diethylaminoethanol, di-n-propylamino ethanol, diethylamino - n - propanol and diethylamino n-butanol.

The most convenient method for the preparation of the esters of the present invention is by reacting an N-disubstituted aminoalkanol with the acid chloride of the diphenylamine 2-monocarboxylic acid.

For the conversion of the diphenylamine 2-monocarboxylic acid into the corresponding acid chloride any of the customary reagents such as phosphorus trichloride, phosphorus pentachloride or carbonyl chloride may be used. It is, however, preferred to use thionyl chloride for this purpose since it readily converts the acids into the acid chlorides at low temperatures thereby avoiding undesirable side reactions.

In carrying out the invention using the acid chloride, the crude acid chloride is conveniently mixed with a dry solution of the amino alcohol at room temperature. The reaction takes place quite readily and is completed by heating the reaction mixture. The ester is readily isolated from the reaction mixture when this is treated with a dilute aqueous alkali carbonate solution and it is preferably purified by conversion to a salt thereof. Preferably an acid which forms a water-soluble salt such as the hydrochloride, acetate, lactate, methane-sulphonate or isethionate is used in such salt formation since the resulting water-soluble salts may be used directly for parenteral administration.

An alternative method for the preparation of the esters of the present invention is from the diphenylamine 2 - monocarboxylic acid anhydrides. In such process the anhydride and the N-disubstituted aminoalkanol are heated alone or in an inert solvent such as benzene, dioxan or acetone. The crude product is treated with dilute aqueous acid such as dilute hydrochloric acid, the insoluble material separated and the crude ester precipitated by addition of dilute aqueous alkali carbonate solution and purified as described above.

A third method for the preparation of the esters of the present invention is from the diphenylamine 2-monocarboxylic acid and the N-disubstituted aminoalkanol. These are heated together under reflux with an aromatic hydrocarbon such as toluene or xylene and the water which forms is distilled off with the aromatic hydrocarbon. Additional hydrocarbon is added as required until distillation of water has substantially ceased whereupon the remaining hydrocarbon is removed and the residue worked up in the same way as the crude product obtained when the diphenylamine 2-monocarboxylic acid anhydride is used as a starting material.

The aminoalkyl diphenylamine 2-monocarboxylic esters, especially in the form of their salts have valuable pharmacological properties.

The following examples illustrate the manner in which the invention may be carried into effect:

Example 1

A mixture of 10.6 gms. of N-phenyl anthranilic acid, 50 ccs. of anhydrous ether and 4 ccs. of thionyl chloride is warmed for a short time to 40° C. and then allowed to stand at 15–20° for 2 hours. The ether is distilled off in vacuo at a temperature not exceeding 30° C. and the residual oily diphenylamine - 2 - carboxylic acid chloride treated with a cold solution of 17 ccs. of diethylaminoethanol in 40 ccs. of dry acetone. The mixture, which boils with the heat of the reaction, is refluxed for 7 hours and the acetone is then distilled off under reduced pressure. The residual oil is dissolved in 250 ccs. of dilute hydrochloric acid and a slight excess of sodium carbonate solution added to precipitate the free ester. The precipitated oil is collected, washed with water, dissolved in ether and the ethereal solution dried over potassium carbonate. On passing dry hydrogen chloride through the filtered ethereal solution, the hydrochloride of the $\beta$-diethylaminoethyl diphenylamine - 2 - carboxylate is precipitated as a white crystalline solid (9.6 g.). On recrystallization from acetone the pure compound is obtained (6.6 g.) melting point 142–144° C. (Found: M, 349; Calc. M, 348). The product is readily soluble in water.

Example 2

14 gms. of 5-chloro-4'-methoxy-diphenylamine-2-carboxylic acid is refluxed with 50 ccs. of dry ether and 4 ccs. of thionyl chloride for 3 hours. The excess ether is removed in vacuo at a temperature below 30° C. the residual acid chloride dissolved in 50 ccs. of acetone and treated with 17 ccs. of $\beta$-diethylaminoethanol. The mixture is refluxed for 1.5 hours and then evaporated to dryness under reduced pressure. Water and dilute aqueous sodium carbonate is added, the lower layer of oil separated, dissolved in ether and the ethereal solution dried. On passing dry hydrogen chloride into the dried solution the hydrochloride of the $\beta$-diethylaminoethyl 5-chloro-4'-methoxy-diphenylamine-2-carboxylate separates as a white crystalline powder (11.8 g.). Recrystallization from an acetone-ethyl acetate mixture gives the pure compound in the form of white needles melting point 152–154° C. (Found: M, 410; Calc. M, 412). The product is readily soluble in water.

Example 3

58 gms. of 4'-phenyl-diphenylamine-2-carboxylic acid, 100 ccs. of dry dioxane, 100 ccs. of dry ether and 20 ccs. of thionyl chloride are warmed together at 45°–50° C. for 3 hours, the solvents then removed in vacuo and the residue dissolved in 500 ccs. of a dry mixture of ethyl acetate and dioxane. This solution is added slowly to a cooled solution of 68 ccs. of $\beta$-diethylaminoethanol in 500 ccs. of a mixture of ethyl acetate, acetone and dioxane and, after standing for 12–16 hours, the solvent is removed at a low temperature. 1000 ccs. of water and 50 ccs. of 10 N sodium hydroxide are added and the resulting mixture extracted repeatedly with ether. The ethereal solution is dried, 50 ccs. of ethyl acetate added and the solution saturated with dry hydrogen chloride. The hydrochloride of the $\beta$-diethylaminoethyl ester of 4'-phenyl-diphenylamine-2-carboxylic acid is filtered off (86 g.) and recrystallised from a mixture of ethylacetate and acetone when the pure hydrochloride is obtained (60 g.) as a mass of yellow micro crystals M. Pt. 138–140° C. (Found: N, 6.7%; Cl, 8.75%, calculated N, 6.16%; Cl, 8.4%).

Example 4

61 gms. of 4'-phenoxy-diphenylamine-2-carboxylic acid, 150 ccs. of dry dioxane, 150 ccs. of dry ether and 20 ccs. of thionyl chloride are mixed together, warmed at 30°–45° C. for 3 hours and the excess solvent removed at low temperature. The residue is dissolved in 500 ccs. of dry acetone, the solution added slowly to a cooled stirred solution of 68 ccs. of $\beta$-diethylaminoethanol in 500 ccs. of dry acetone and, after standing overnight at 20° C., the product isolated in the same manner as described in Example 3. The hydrochloride of the $\beta$-diethylaminoethyl ester of 4'-phenoxy-diphenylamine-2-carboxylic acid is obtained in good yield as a mass of micro needles, M. Pt. 110° C.

Example 5

65 gms. of 4'-phenylamino-diphenylamine-2-carboxylic acid is converted to the acid chloride and this then treated with $\beta$-diethylaminoethanol in the same manner as described in Example 4 and the hydrochloride of the $\beta$-diethylaminoethyl ester of 4'-phenylamino-diphenylamine-2-carboxylic acid isolated in the same manner in good yield as a grey-yellow microcrystalline powder.

What we claim is:

1. As a new product a diphenylamino 2-carboxylic acid ester having the general formula

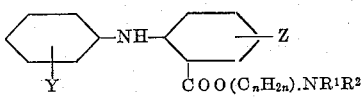

in which $R^1$ and $R^2$ are alkyl groups, $n$ is an integer not greater than six, Y is selected from the group consisting of hydrogen, alkoxy, phenyl, phenylamino and phenoxy and Z is selected from the group consisting of hydrogen and halogen.

2. As a new article of manufacture an omega-dialkylaminoalkyl ester of a diphenylamine 2-mono-carboxylic acid of the general formula

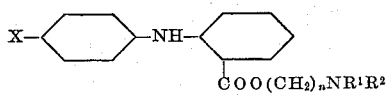

in which $R^1$ and $R^2$ are alkyl groups, $n$ is an integer not greater than six and X is a phenyl residue.

3. As a new article of manufacture β-diethylaminoethyl 4'-phenyl - diphenylamine 2-carboxylate.

4. As a new article of manufacture β-diethylaminoethyl 4-phenoxy-diphenylamine 2-carboxylate.

5. As a new article of manufacture β-diethylamino ethyl 4'-phenylamino-diphenylamine 2-carboxylate.

6. A process for the production of an omega dialkyl-amino ester of a diphenylamine 2-carboxylic acid of the general formula

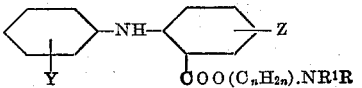

in which $R^1$ and $R^2$ are alkyl groups, $n$ is an integer not greater than six, Y is selected from the group consisting of hydrogen, alkoxy, phenyl, phenylamino and phenoxy and Z is selected from the group consisting of hydrogen and halogen which comprises the steps of mixing an esterifiable functional derivative of a diphenylamine 2-monocarboxylic acid carrying the substituents Y and Z with an aminoalcohol of the general formula

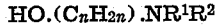

$$HO.(C_nH_{2n}).NR^1R^2$$

in which $R^1$, $R^2$ and $n$ are as above defined, reacting the mixture to form the ester of said substance and recovering said ester from the reaction mixture.

7. A process for the production of an omega dialkylamino ester of a diphenylamine 2-carboxylic acid of the general formula

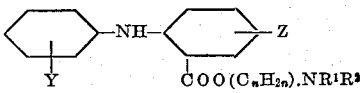

in which $R^1$ and $R^2$ are alkyl groups, $n$ is an integer not greater than six, Y is selected from the group consisting of hydrogen, alkoxy, phenyl, phenylamino and phenoxy and Z is selected from the group consisting of hydrogen and halogen which comprises forming an acid halide of a diphenylamine 2-carboxylic acid carrying the substituents Y and Z, reacting the acid halide with an amino alkanol of the general formula

$$HO.(C_nH_{2n}).NR^1R^2$$

in which $R^1$ and $R^2$ and $n$ are as above defined and recovering the ester from the reactance mixture.

8. A process for the production of an omega dialkylamino ester of a diphenylamine 2-carboxylic acid of the general formula

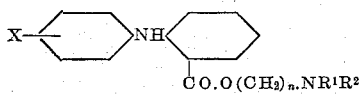

in which $R^1$ and $R^2$ are alkyl groups, $n$ is an integer not greater than six and X is a phenyl residue which comprises the steps of mixing an esterifiable functional derivative of a diphenylamine 2-monocarboxylic acid having the substituent X in the phenyl nucleus not carrying the carboxyl group with an amino alcohol of the general formula

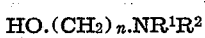

$$HO.(CH_2)_n.NR^1R^2$$

in which $R^1$, $R^2$ and $n$ are as above defined, reacting the mixture to form the ester of said substance and recovering said ester from the reaction mixture.

9. A process for the production of a β-diethylaminoethyl ester of a diphenylamine 2-carboxylic acid of the general formula

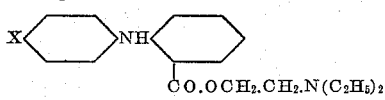

in which X is a phenyl residue which comprises forming the acid chloride of said diphenylamine 2-carboxylic acid, reacting said acid chloride with β-diethylaminoethanol and recovering said ester from the reaction mixture.

ALAN AUGUST GOLDBERG.
HAROLD SILAS TURNER.

REFERENCES CITED

The following references are of record in the file of this patent:

UNITED STATES PATENTS

| Number | Name | Date |
|---|---|---|
| 1,889,645 | Eisleb | Nov. 29, 1932 |
| 1,976,923 | Christiansen et al. | Oct. 16, 1934 |
| 2,342,142 | Harris et al. | Feb. 22, 1944 |

OTHER REFERENCES

Rosenmund et al., "Berichte," vol. 56 (1923), page 1487.

Goodman et al., "Chem. Abstracts," vol. 27 (1933), page 5732.

Ghigi, "Chem. Abstracts," vol. 34 (1940), page 2346.

Provinciali et al., "Chem. Abstracts," vol. 38 (1944), page 5297.

Beilstein, Fourth edition, vol. 14, page 330.

Certificate of Correction

Patent No. 2,502,451 April 4, 1950

ALAN AUGUST GOLDBERG ET AL.

It is hereby certified that errors appear in the printed specification of the above numbered patent requiring correction as follows:

Column 1, line 44, after the word "aryloxy" insert (*for example, phenoxy*), *alkyl,*; column 5, line 40, for that portion of the formula reading "NR¹R" read *NR¹R²*; column 6, line 9, for "reactance" read *reaction*;

and that the said Letters Patent should be read with these corrections therein that the same may conform to the record of the case in the Patent Office.

Signed and sealed this 8th day of August, A. D. 1950.

[SEAL]

THOMAS F. MURPHY,
*Assistant Commissioner of Patents.*